United States Patent
Strehl

(10) Patent No.: US 8,170,817 B2
(45) Date of Patent: May 1, 2012

(54) METHOD AND DEVICE FOR DETERMINING THE ELECTRICAL LOADABILITY OF OVERHEAD LINES BY MEANS OF TEMPERATURE MEASUREMENT

(75) Inventor: Thomas Strehl, Radebeul (DE)

(73) Assignee: Doble Lemke GmbH, Kesseldorf (DE)

( * ) Notice: Subject to any disclaimer, the term of this patent is extended or adjusted under 35 U.S.C. 154(b) by 586 days.

(21) Appl. No.: 12/301,250

(22) PCT Filed: May 18, 2007

(86) PCT No.: PCT/DE2007/000946
§ 371 (c)(1),
(2), (4) Date: May 15, 2009

(87) PCT Pub. No.: WO2007/134597
PCT Pub. Date: Nov. 29, 2007

(65) Prior Publication Data
US 2010/0017153 A1    Jan. 21, 2010

(30) Foreign Application Priority Data
May 18, 2006 (DE) .......................... 10 2006 024 357

(51) Int. Cl.
G01R 11/02 (2006.01)
G01R 19/08 (2006.01)
G01R 19/32 (2006.01)
G01R 19/03 (2006.01)

(52) U.S. Cl. ................. 702/60; 702/61; 702/62; 702/65

(58) Field of Classification Search ............... 702/62, 702/105, 130, 179, 181, 183, 184, 188; 324/106; 340/501; 361/64; 700/292
See application file for complete search history.

(56) References Cited

U.S. PATENT DOCUMENTS

| | | | |
|---|---|---|---|
| 5,140,257 A * | 8/1992 | Davis | 324/106 |
| 5,933,355 A | 8/1999 | Deb | |
| 6,195,243 B1 * | 2/2001 | Spencer et al. | 361/64 |
| 6,441,603 B1 | 8/2002 | Lawry | |
| 7,400,239 B2 * | 7/2008 | Kiko et al. | 340/501 |
| 7,706,927 B2 * | 4/2010 | Naumann et al. | 700/292 |

FOREIGN PATENT DOCUMENTS

DE    10038815 A1    2/2002

OTHER PUBLICATIONS

Teminova Renata et al. New method of temperature measurement in high-voltage systems by passive remote SAW sensors; Proceedings of the XIVth International Symposium on High Voltage Engineering; Tsinghua University, Beijing China, Aug. 25-29, 2005.

(Continued)

Primary Examiner — Mohamed Charioui
Assistant Examiner — Felix Suarez
(74) Attorney, Agent, or Firm — Gudrun E. Huckett

(57) ABSTRACT

In a method for determining the electrical loadability of power lines by temperature measurement, the temperature is measured with at least one sensor arranged on the power line and connected to a data processing system, wherein the time-dependent temperature of the power line is determined by an existing or a weighted load parameter, and wherein based on the electrical current and the temperature measured by the sensor, taking into account either the existing or a weighted load parameter, a time-dependent electrical load is determined in the data processing system.

3 Claims, 3 Drawing Sheets

OTHER PUBLICATIONS

Chisholm W.A.; Barrett; J.S.: Ampacity Studies on 49 degrees C rated transmission line, IEEE Transactions on Power Delivery; vol. 4, No. 2, Apr. 1989.

Callahan P.M., Douglass D.A.: An experimental evaluation of a thermal line uprating by conductor temperature and weather monitoring. IEEE Transactions on Power Delivery: vol. 3, No. 4, Oct. 1988, pp. 1960-1967.

* cited by examiner

METHOD AND DEVICE FOR DETERMINING THE ELECTRICAL LOADABILITY OF OVERHEAD LINES BY MEANS OF TEMPERATURE MEASUREMENT

BACKGROUND OF THE INVENTION

The invention concerns methods and devices for determining the electrical loadability of overhead lines by means of temperature measurement.

DE 100 38 815 A1 (Method, system and arrangement for current overload of components in medium-voltage and high-voltage power grid) discloses a method for controlled current overload of at least one component of a medium-voltage or high-voltage power grid. For this purpose, a system carries out a measurement of at least one parameter that affects the current overload capability at least at one measuring location in the area of the at least one component as well as at determined time intervals, respectively. By means of the measured values of a parameter obtained in the predetermined time intervals a folded sum is generated with a component-specific as well as parameter-specific weighting function by means of mathematical folding and, for at least one location in the area of the at least one component or for the at least one component as a whole, a new value for a parameter that affects the current overload capability of the system is determined on the basis of the respective folding sums. The basis of this method is the knowledge of a parameter that directly affects the current overload capability. Power lines are however exposed to continuously changing ambient conditions and energy flows.

The invention has the object to provide a method and a device to determine the electrical loadability of power lines in a simple way.

SUMMARY OF THE INVENTION

This object is solved in connection with the method in that by means of at least one sensor arranged on the power line and connected to a data processing system the temperature is measured, in that the time-dependent temperature of the power line is determined by an existing or a weighted load parameter, and in that based on the electrical current and the temperature measured by the sensor, taking into account either the existing or a weighted load parameter, a time-dependent electrical load is determined in the data processing system, and is solved in connection with the device in that on the power line a sensor connected to a data processing system is arranged for measuring the temperature and in that it is a data processing system that, based on the measured temperature, the electrical current and by taking into account either the existing or a weighted load parameter, determines a time-dependent electrical load, wherein the time-dependent temperature of the power line is determined based on the existing or a weighted load parameter.

The methods and devices for determining the electrical loadability of power lines is characterized in particular in that their loadability can be determined in a simple way at present as well as prognostically.

For this purpose, by means of at least one sensor arranged on the power line and connected to a data processing system the temperature is measured, the time-dependent temperature of the power line is determined by the existing or a weighted load parameter, and, based on the electrical current and the temperature measured by the sensor, taking into account either the existing or a weighted load parameter, a time-dependent electrical load is determined in the data processing system.

A power line is an electrical line in particular for electrical power transmission. Known steel-aluminum cables with a steel core for mechanical strength and aluminum coating for good conductivity are used as conductors, for example. For higher voltages several conductor cables can be mounted as a bundled conductor.

The methods and devices for determining the electrical loadability of power lines are characterized advantageously in that by means of the temperature at the power line the loadability of the power line itself can be derived. For this purpose, the temperature at the power line is measured and, based on the existing time-dependent ambient conditions and the time-dependent heating caused by the electrical power flowing through the power line, the also time-dependent temperature in the power line as conductor temperature is derived as a function of time. Based on the current measurements and the currently existing ambient conditions the loadability of the power line is derived for the near or distant future on the basis of the respective conductor temperatures and the thus existing or determined electrical load. For this purpose, the loads are estimated and the loadability is calculated by application of statistical methods. Possible loads of the power line as a function of these ambient conditions, predictably changing ambient conditions, and changing transmitted energies are taken into account for determining the electrical loadability as a function of the calculated conductor temperatures. Based on this a future load or future loads are determined.

Advantageously, several sensors for measuring the temperatures are arranged on power lines of the power grid. In this way, the possible power transport within the power grid can be determined so that an optimal utilization of the delivery and consumption of the electrical power of the power grid is possible. Moreover, in particular connectable power sources that do not supply electrical power at all times, can be integrated more easily into the power grid in accordance with the existing and future loads of the power grid.

A further advantage resides in that the produced overcapacities can be transferred, load fluctuations can be compensated, and overloads of existing power lines can be prevented.

In this way, in power line power grids an optimal power transport can be adjusted. With respect to evident supply shortages in regard to consumption of electrical power or overcapacities in the supply of electrical power, particularly by taking into account the ambient conditions, it is easily possible to react manually in an anticipatory way in the control rooms.

With the weighted temperature of the power line derived from the weighted load parameter and an ambient temperature taking into consideration the limit temperature of the power line, in the data processing system a load current for the power line as a load prognosis of the power line is determined. This load prognosis is calculated by means of statistical methods even overextended periods of time as a function of time. In this way, an optimal future capacity utilization of a power grid can be calculated. Future suppliers and consumers can be easily taken into account in this load prognosis.

Based on existing monitoring values, values of individual measurements and weighting assigned to individual measurements, deduced estimated values for weighted load parameters are determined in the data processing system. Weighting values of ambient temperatures, wind velocities, wind directions, solar radiation, each individually or in at least one combination, as saved data in the data processing system form the basis for determining the load parameters in the near and distant future. The weighting values are generated from empirical values of the past. In connection with the prognosis for the ambient conditions, the prognosis of the load parameters of the power line can be calculated in the data processing system.

According to another embodiment, sensors for measuring the temperature are arranged on power lines of a power grid for electrical power transmission and the sensors are connected by means of a sender connected to the sensor to a receiver wherein the receiver is connected to the data processing system. In this way, by means of load parameters the electrical load of the power lines of a power grid is determined so that a current or future prognosis of the electrical load can be determined in the data processing system.

Advantageously, the sensor is an acoustic surface wave component with at least one antenna. Furthermore, each of the sensors is connected by a control unit to the receiver of the data processing system wherein the control unit can be a first sending/receiving unit for electromagnetic waves as a connection to the acoustic surface wave component with the antenna as well as at least one second sending unit for electromagnetic waves as a connection to the receiver connected to the data processing system. In this way, advantageously a passive sensor is positioned on the power line whose measured values can be remotely queried.

The sensor is arranged on a clamp, a support, a connector or a fixture for the power line. In this way, the sensor can be arranged easily on an existing power line or a power lines to be newly installed. In this connection, it is arranged on these elements or is a component of these elements.

BRIEF DESCRIPTION OF THE DRAWINGS

One embodiment of the invention is illustrated schematically in the drawings, respectively, and will be explained in more detail in the following.

It is shown in.

DESCRIPTION OF PREFERRED EMBODIMENTS

In the following embodiment a method and a device for determining the electrical loadability of power lines 1 will be explained together in more detail.

The device for determining the electrical loadability of a power line 1 is comprised substantially of a data processing system 4 and at least one sensor 7 connected therewith for measuring the temperature on the power line 1 wherein the sensor 7 is arranged on the power line 1.

Figure 1:
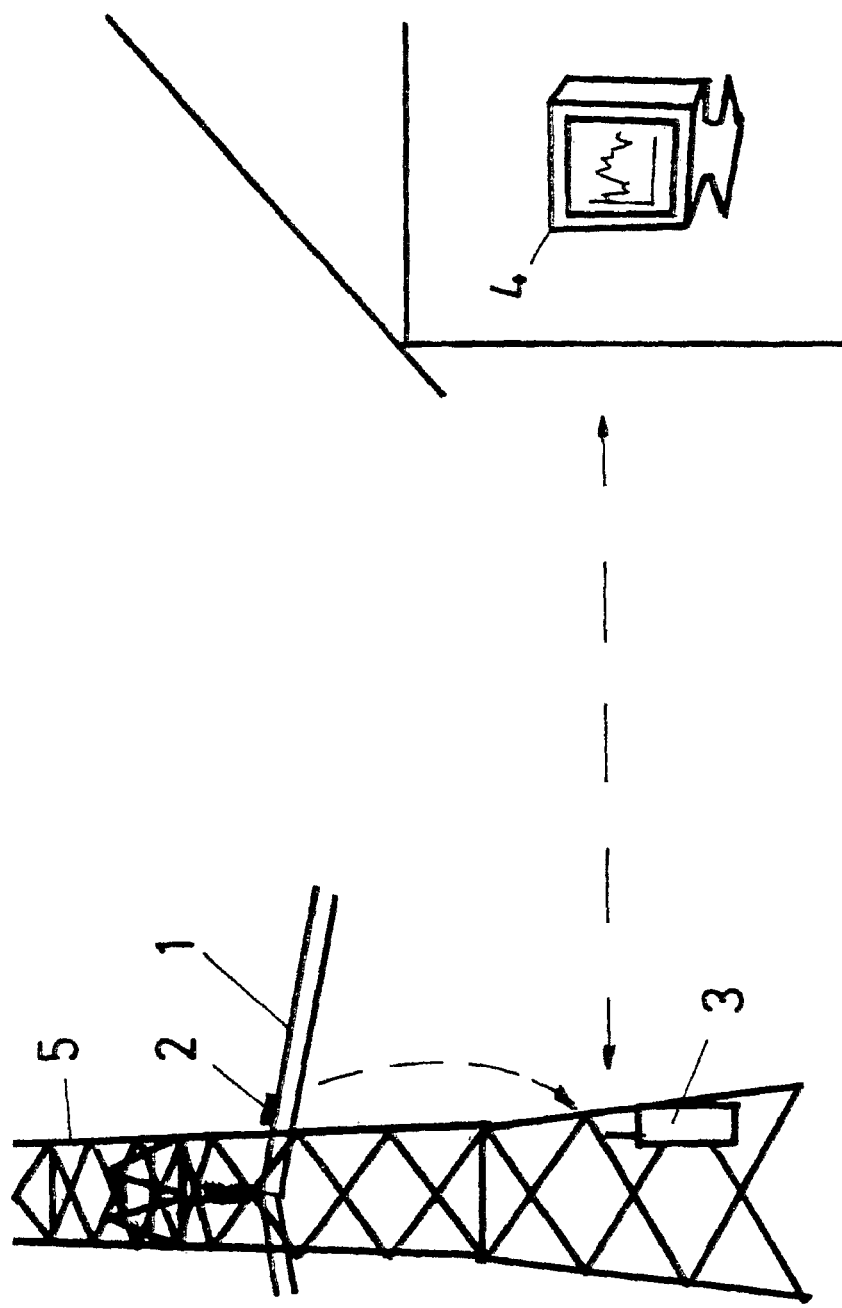
FIG. 1 a device for determining the electrical loadability of a power line.

FIG. 1 shows a device for determining the electrical loadability of a power line 1 in a schematic illustration.

The sensor 7 for temperature measurement is arranged on the power line 1. For this purpose, the sensor 7 is located on a clamp, a support, a connector, or a fixture 6 for the power line 1 or is a component of a clamp, a support, a connector, or a fixture 6, wherein the temperature on the sensor 7 is the basis for determining the temperature of the power line 1. The sensor 7 is connected or connectable wireless to the control unit 3 so that the measured values of the sensor 7 can reach the control unit 3. The control unit 3 has for this purpose a first sending/receiving device for electromagnetic waves as a connection to the sensor 7. By means of the sent and received electromagnetic waves the measured values of the sensor 7 reach the control unit 3. For this purpose, the control unit 3 is preferably a computer, for example, a microcomputer. For transmitting the measured values of the sensor 7 to the data processing system 4 the control unit 3 has a second sending/receiving unit for electromagnetic waves. The data processing system 4 has a third sending/receiving unit for electromagnetic waves so that the control unit 3 is controllable by the data processing system 4 and the measured values of the sensor 7 can be transmitted wireless to the data processing system 4. For this purpose, the data processing system 4 is a known computer. The sensor 7 is located advantageously in the vicinity of a tower 5 for the power line 1 and the control unit 3 is arranged on the tower 5. Of course, several sensors 7 can also be connected wireless to a control unit 3.

The time-dependent temperature of the power line 1 is determined by existing or weighted load parameters. Based on the electrical current and the temperature measured by the sensor 7, the time-dependent electrical load is determined in the data processing system 4 taking into consideration either the existing or a weighted load parameter. The temperature and the geometric and material properties of the power line 1 determine its electrical resistance and the loadability of the power line 1 itself.

Used are methods of technical statistics as a combination of all methods of statistics that are useable in engineering or are tailored for this purpose. They include inter alia statistical testing methods and regression and correlation analyses for detecting and describing correlations. The basis is test planning. Based on existing monitoring values, values of individual measurements and weighting values assigned to individual measurements, estimated values for weighted load parameters are derived in the data processing system 4 so that current and future load parameters become the basis of the existing temperatures in the power line 1. Accordingly, temperatures of the power line 1 as a function of weighted load parameters can be determined in the data processing system 4 and based thereon the resulting load.

Figure 2:
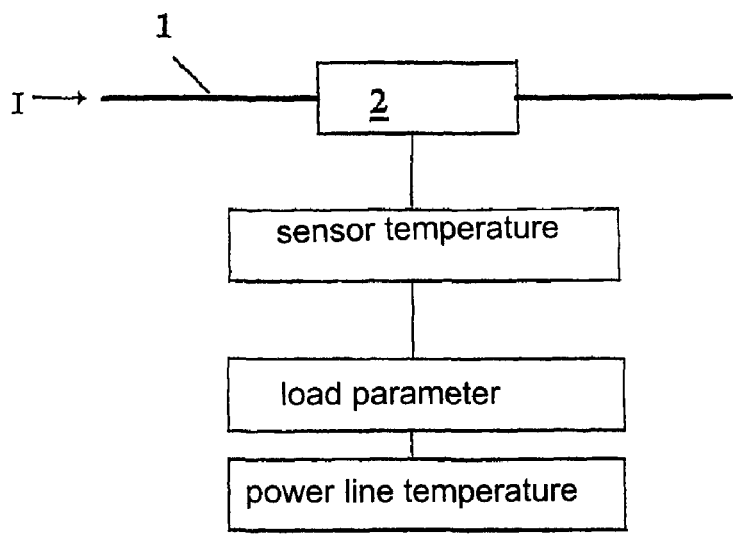
FIG. 2 the determination of the electrical load from the determined temperature on the power line in an overview illustration.

FIG. 2 shows the determination of electrical load based on the determined temperature on the power line 1 in an overview illustration.

Basis of the weighted load parameters are the weighting values of the ambient temperatures, wind velocities, wind directions, solar radiation, each individually or in at least one combination, that are saved in the data processing system 4.

In one variant of the embodiment, by means of the weighted temperature of the power line 1, based on the weighted load parameter and an ambient temperature taking into account the limit temperature of the power line 1, a possible load current for the power line 1 as load prognosis of the power line 1 is determined in the data processing system 4. Basis of the weighted temperature of the power line 1 is the temperature of the sensor 7 and the load parameters of the power line 1.

Figure 3:
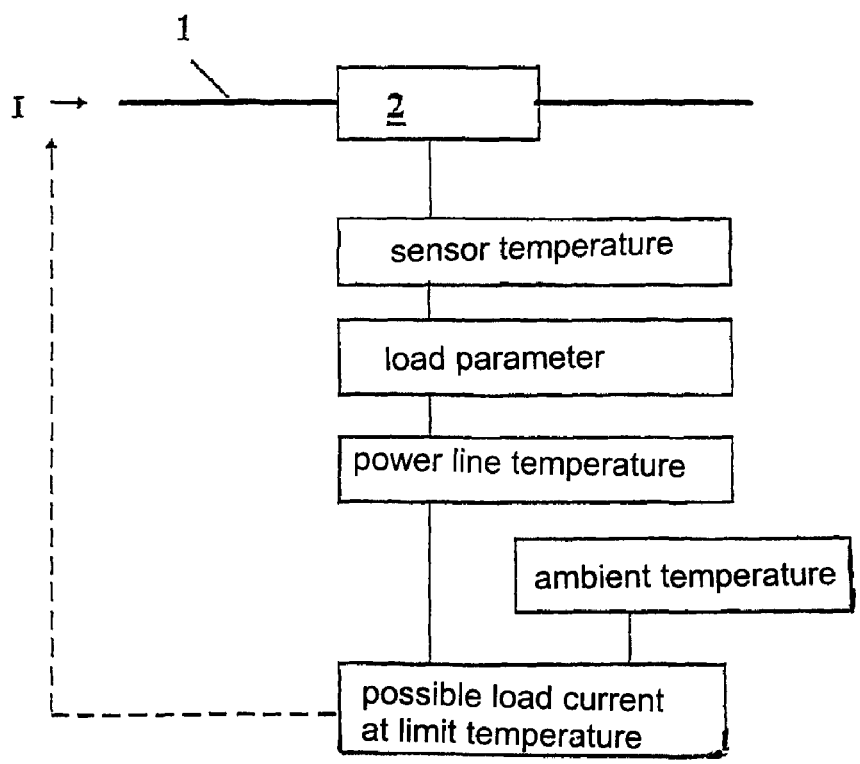
FIG. 3 the determination of the electrical loadability of a power line in an overview illustration.

FIG. 3 shows the determination of electrical loadability of a power line 1 in an overview illustration.

Used are again methods of technical statistics as a combination of all methods of statistics that are useable in engineering or are tailored for this purpose. They include inter alia statistical testing methods and regression and correlation analyses for detecting and describing correlations. The basis is test planning. Based on existing monitoring values, values of individual measurements and weighting values assigned to individual measurements deduced estimated values weighted load parameters are derived in the data processing system 4. The weighting values of ambient temperatures, wind velocities, wind directions, solar radiation, each individually or in at least one combination, are saved in the data processing system 4.

The sensor 7 for temperature measurement is a known acoustic surface wave component with at least one antenna 8. The sensor 7, as is known in the art, is a component of a piezoelectric substrate on which an electrical transducer with finger-shaped structure is applied at the input side and the output side. On the basis of piezoelectricity electrical power is converted into acoustic energy and vice versa. The propagation time behavior of the acoustic energy is used for temperature measurement. Of course, other known sensors for temperature measurement can be employed.

The sensor 7 itself is arranged on the fixture 6 for the power line 1. The fixture 6 is a body that is connected to the power line 1.

Figure 4:
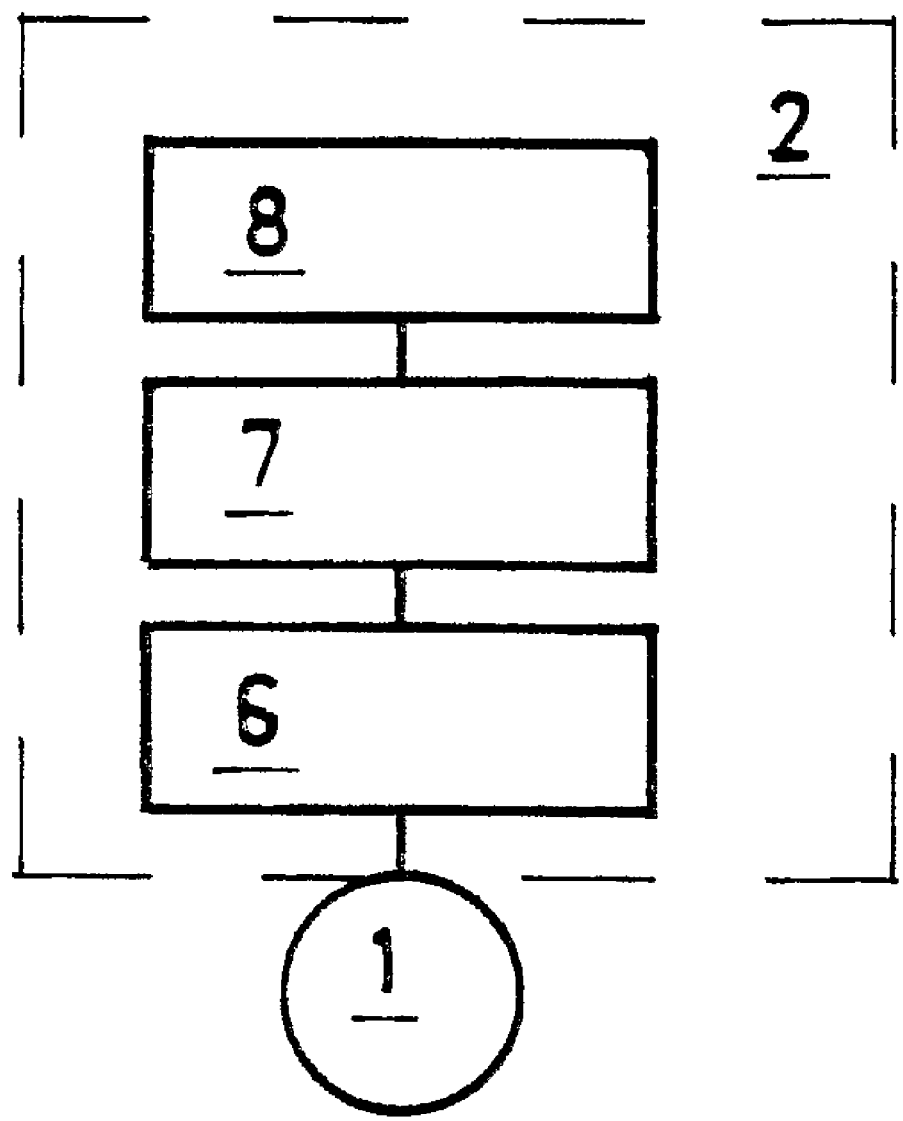
FIG. 4 a fixture with a sensor on a power line.

FIG. 4 shows a fixture 6 with a sensor 7 on a power line 1 in a schematic illustration.

What is claimed is:

1. A method for determining the electrical loadability of power lines by temperature measurement, comprising the steps of:
    determining estimated values for weighted load parameters in a data processing system based on existing monitoring values, values of individual measurements, and weighting values assigned to individual measurements, wherein the weighting values of ambient temperatures, wind velocities, wind directions, solar radiation, each individually or in at least one combination, are saved in the data processing system;
    arranging at least one sensor on a clamp, a support, a connector, or a fixture for the power line or providing the at least one sensor as a component of a clamp, a support, a connector or a fixture of the power line and connecting the at least one sensor to the data processing system;
    measuring a temperature with the at least one sensor;
    determining, based on the electrical current of the power line and the temperature measured by the at least one sensor, taking into account the weighted load parameters, a time-dependent electrical load in the data processing system;
    calculating, in the data processing system, load currents for the power line as a load prognosis of the power line by using a weighted temperature of the conductor of the power line, based on the weighted load parameters and an ambient temperature with consideration of the limit temperature of the power line.

2. A device for determining the electrical loadability of power lines, the device comprising:
    a temperature sensor;
    a data processing system connected to the temperature sensor;
    wherein the data processing system, based on existing monitoring values, values of individual measurements, and weighting values assigned to individual measurements, determines estimated values for weighted load parameters, wherein the weighting values of ambient temperatures, wind velocities, wind directions, solar radiation, each individually or in at least one combination, are saved in the data processing system;
    wherein the temperature sensor is arranged on a clamp, a support, a connector, or a fixture for the power line or is a component of a clamp, a support, a connector or a fixture of the power line;
    wherein the data processing system, based on the measured temperature measured by the temperature sensor and the electrical current of the power line and by taking into account the weighted load parameters, determines a time-dependent electrical load;
    wherein, based on a weighted temperature of the conductor of the power line, the data processing system calculates, based on the weighted load parameters and an ambient temperature with consideration of the limit temperature of the power line, load currents for the power line as a load prognosis of the power line.

3. The device according to claim 2, wherein on the power lines of a power grid for electrical power transmission several of said temperature sensor are arranged and connected each by a sender connected to said sensor with a receiver, wherein the receiver is connected to the data processing system.

* * * * *